United States Patent
Knudsen et al.

(10) Patent No.: US 6,510,103 B1
(45) Date of Patent: Jan. 21, 2003

(54) SEISMIC CABLES AND A METHOD FOR MANUFACTURING SUCH

(75) Inventors: Anton Marius Knudsen, Enerhaugen (NO); Jorn Wardeberg, Billingstadasen (NO)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/023,793

(22) Filed: Dec. 21, 2001

Related U.S. Application Data

(63) Continuation of application No. 09/334,684, filed on Jun. 17, 1999, now Pat. No. 6,333,897.

(30) Foreign Application Priority Data

Jun. 19, 1998 (NO) .......................................... 19982890

(51) Int. Cl.[7] .................................................. G01V 1/20
(52) U.S. Cl. ........................................... 367/15; 367/20
(58) Field of Search ............................... 367/15, 20, 154, 367/153, 157, 188; 702/1

(56) References Cited

U.S. PATENT DOCUMENTS

| | | | | |
|---|---|---|---|---|
| 4,160,229 A | * | 7/1979 | McGough | 340/7 R |
| 4,241,427 A | * | 12/1980 | Swenson | 367/20 |
| 4,371,234 A | | 2/1983 | Parfree et al. | 350/96.23 |
| 4,491,939 A | | 1/1985 | Carpenter | 367/20 |
| 4,689,777 A | * | 8/1987 | Roever | 367/153 |
| 4,920,523 A | | 4/1990 | Kruka et al. | 367/188 |
| 6,021,091 A | * | 2/2000 | Gaiser | 367/20 |
| 6,041,282 A | | 3/2000 | Wardeberg et al. | 702/1 |
| 6,108,267 A | * | 8/2000 | Pearce | 367/20 |
| 6,128,251 A | * | 10/2000 | Erath et al. | 367/154 |
| 6,211,964 B1 | * | 4/2001 | Luscombe et al. | 356/477 |
| 6,333,897 B1 | * | 12/2001 | Knudsen et al. | 367/20 |
| 6,333,898 B1 | * | 12/2001 | Knudsen et al. | 367/157 |

FOREIGN PATENT DOCUMENTS

| | | | | |
|---|---|---|---|---|
| GB | 2327756 A | * | 2/1999 | G01V/1/20 |
| GB | 2338555 A | * | 12/1999 | G01V/1/20 |
| GB | 2338556 A | * | 12/1999 | G01V/1/20 |
| NO | 305266 | * | 4/1999 | |
| NO | 308680 | * | 10/2000 | 367/20 |
| NO | 308681 | * | 10/2000 | 367/20 |

* cited by examiner

*Primary Examiner*—Edward Lefkowitz
*Assistant Examiner*—Victor J. Taylor
(74) *Attorney, Agent, or Firm*—Sughrue Mion, PLLC

(57) ABSTRACT

A seismic cable (1) including a plurality of electrical/optical elements (5) which are arranged to be interconnected with a number of seismic sensor devices (24) arranged at intervals along the cable and installed in a housing (15) integrated in the cable (1). The sensor housing (15) is centrally arranged in the cable (1) and interconnected with a central strength element (2). The electrical/optical elements (5) are arranged over and around the central element (2) and over the housing (15).

18 Claims, 4 Drawing Sheets

SEISMIC CABLES AND A METHOD FOR MANUFACTURING SUCH

This is a continuation of application Ser. No. 09/334,684 filed Jun. 17, 1992 now U.S. Pat. No. 6,333,897; the disclosure of which is incorporated herein by reference.

BACKGROUND OF THE INVENTION

The present invention relates to seismic cables in general and in particular to seabed laid seismic cables. Such cables are arranged to be installed in arrays to cover a certain area on the seabed. The seismic cables are designed to detect sound wave signals reflected from subsea oil and gas reservoirs when air guns are detonated in the sea.

The seismic cables include a number of sensor devices which are powered from a surface vessel. The array of seabed seismic cables may also include electronic units for signal processing. The cables therefore also include power conductors for the electronic units and for the sensors, as well as signal conductors for interconnections and transmitting processed signals detected by the sensors to the vessel.

SUMMARY OF THE INVENTION

The object of the present invention is to provide an improved seabed laid seismic cable which can be manufactured in long lengths. The main features of the invention are defined in the accompanying claims. With this invention we have obtained a type of seismic cable which is suitable for installation on the seabed and which can be connected in arrays.

BRIEF DESCRIPTION OF THE DRAWINGS

Above mentioned and other features and objects of the present invention will clearly appear from the following detailed description of embodiments of the invention taken in conjunction with the drawings where FIG. 1 schematically illustrates a cross section of a cable.

DETAILED DESCRIPTION OF THE INVENTION

Figure 1:
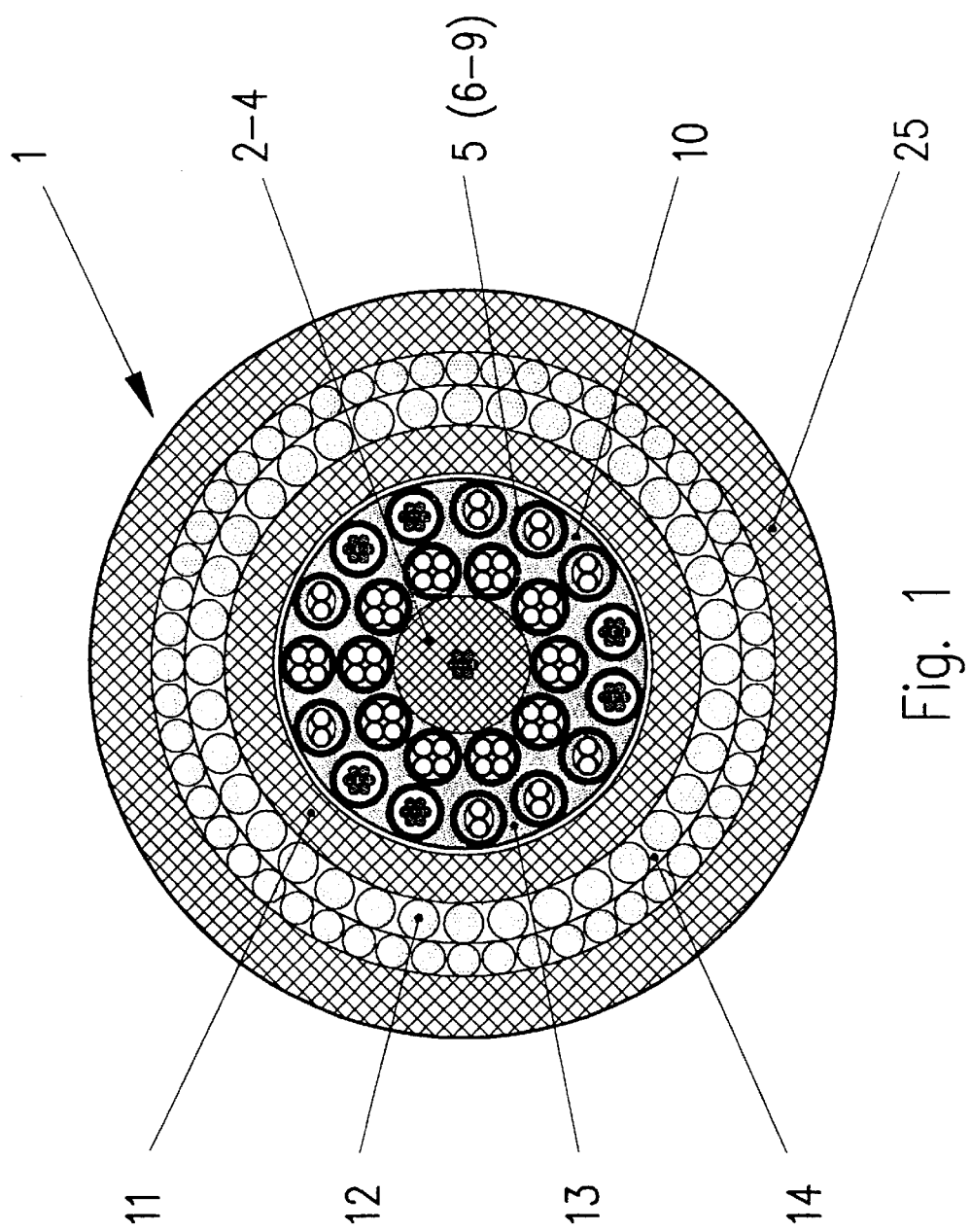

In FIG. 1—which is not drawn to scale—the sensor cable 1 corresponding to the invention includes a central element 2 consisting of a core member 3, made of steel, and a sheathing 4 of polymeric materials, e.g. polyethylene. Power and signal conductors 5 (electrical and/or optical) surround the central element 2. These conductors 5 which may include pairs 6, quads 7 or other conductor elements 8 and 9 may be stranded helically or SZ-wise around the central element 2, but they may also be arranged axially.

All the conductors will be wrapped by a tape 10 made of a polymeric material and a protective inner sheath 11 made e. g. of thermoplastic polyester will be surrounded by an armouring 12, e. g. made of stranded steel wires. The interstices 13 in the cable core may be filled with a water blocking compound, such as petroleum jelly, the interstices 14 in the armouring are filled with a bitumen compound.

Figure 2:
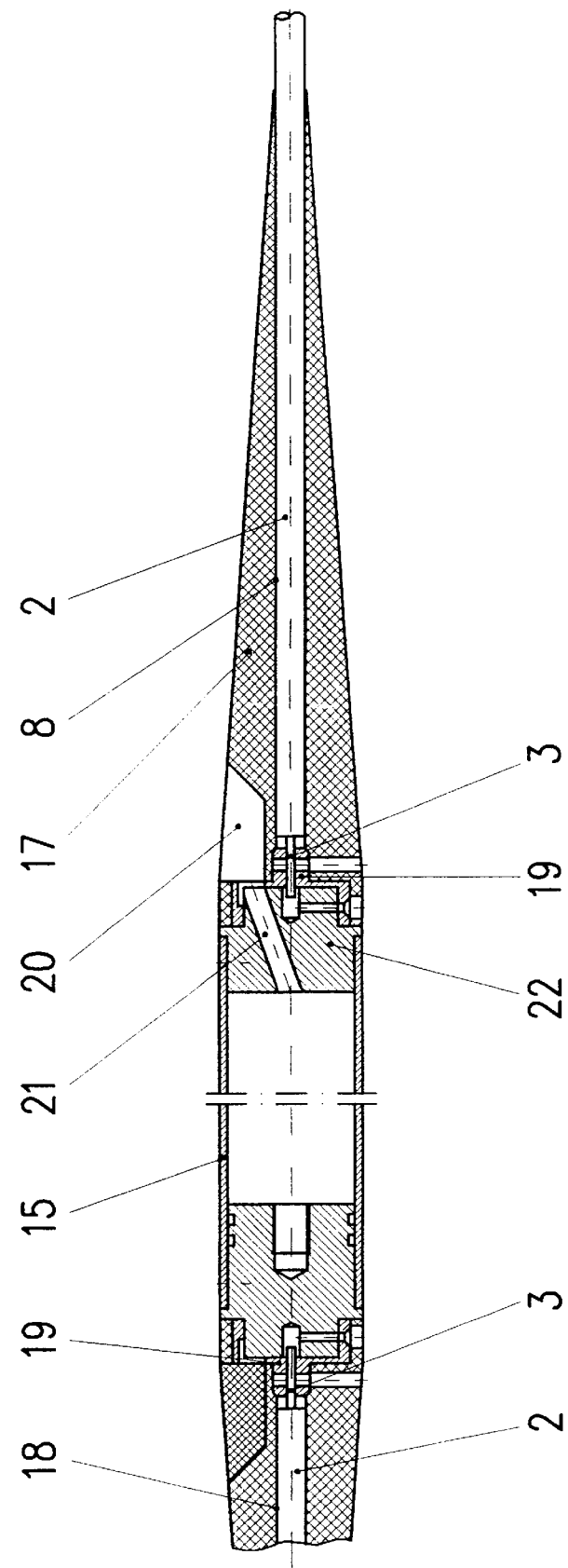
FIGS. 2 and 3 illustrate a side view of a housing for the sensors to be integrated in the cable.

As shown in FIG. 2 a housing 15 for the sensors, namely the geophones and hydrophones, for amplifiers, connector elements etc., is mechanically connected on both ends with cones 17 made e. g. of polyurethane and having an inner bore 18 for introducing the central elements 2 of both cable ends from both sides, whereby the core members 3 are connected with a device 19 for having the housing 15 mechanically stabilized inside the cable.

A cavity 20 and a bore 21 through the walls 22 of the housing 15 serve for connection purposes with the elements inside and the electrical wires outside the housing.

The integration of the housing in the cable can be done after manufacture of the whole cable length by cutting the cable inserting the housing and—having made the connection between the electrical/optical elements inside and outside the housing—by replacing the armouring. As the dimensions of the housing—in accordance with the invention—should be as small as possible, a special advantage will be to have the housing integrated in the cable length before stranding the armouring wires onto the cable, so that cable armouring and armouring of the housing will take place in line.

Figure 3:
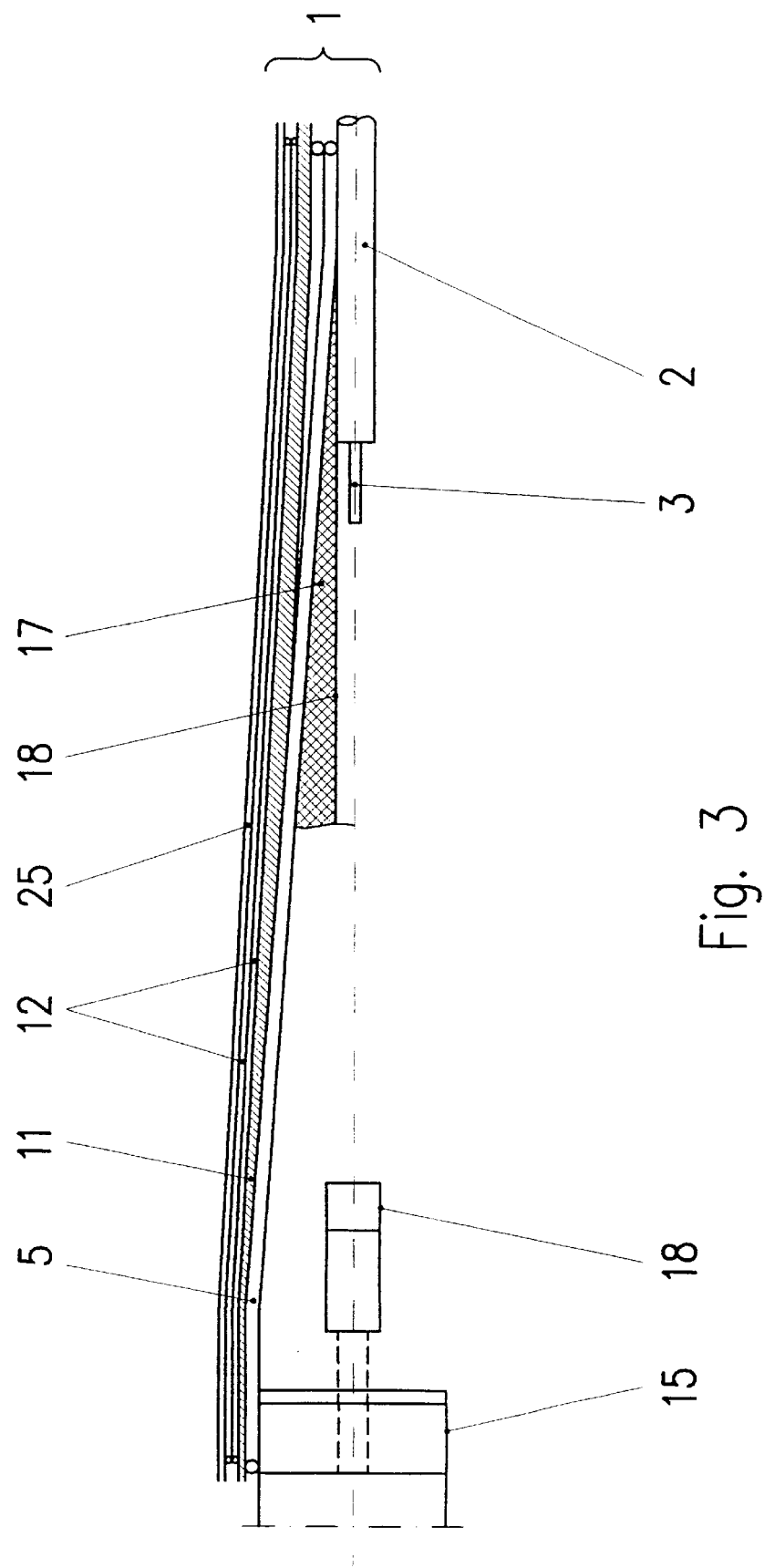

FIG. 3 illustrates such a cable design, where the electrical conductors 5 of the cable 1 surround the housing 15 for the sensor elements. The conductors are protected by the plastic sheath 11 and two layers of an armouring 12 which consists of stranded steel wires. The cones 17 on both ends of the housing 15 provide support to the conductors 5 and the armouring 12 from one end of the cable 1 via the housing 15 to the other end of the cable. These cones also act as bending restrictors for the cable/housing.

Figure 4:
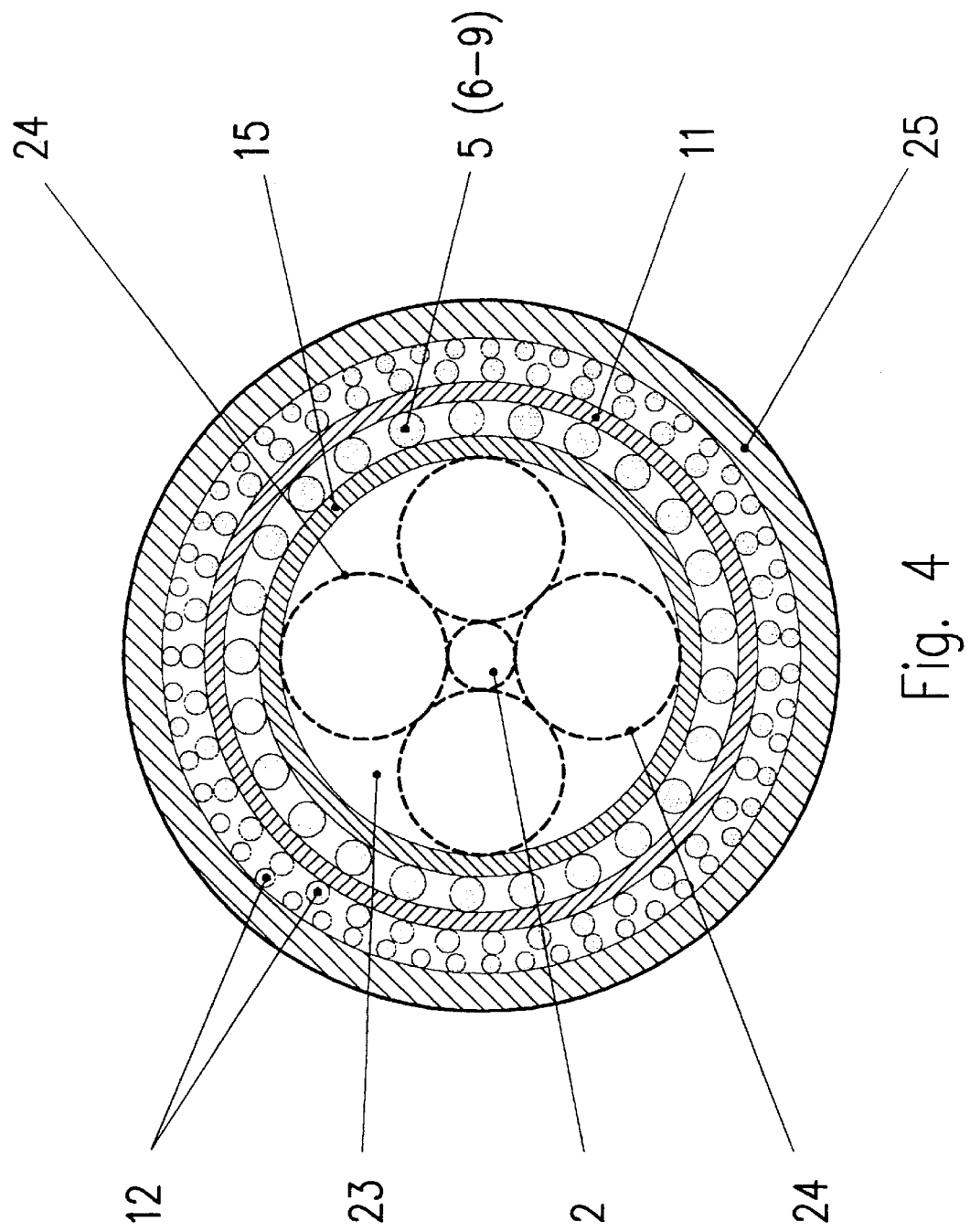
FIG. 4 illustrates a cross section of the housing integrated in the cable corresponding to FIG. 1.

A cross section of the housing 15 integrated in the cable 1 is shown in FIG. 4. The central element 2 is fastened to the housing in any way, and the area 23 inside the housing 15 gives the possibility to install the sensor elements 24 in a very confined space.

Outside the housing 15 the conductors 5 are distributed over its surface. The polymeric sheath 11 will cover these conductors before the armouring wires 12 are stranded around.

When the seismic cable according to the invention is made in long lengths which at a later step is to be cut into a number of discrete lengths each including a certain number of sensor groups, the armour layer has to be marked with colors or otherwise in order to facilitate cutting at suitable positions between sensor groups.

The above detailed description of embodiments of this invention must be taken as examples only and should not be considered as limitations on the scope of protection. The principles of the invention which have been described in connection with marine seabed laid seismic cables, can also be used in connection with towed seismic cables and on shore seismic cables.

What is claimed is:

1. A seismic cable, comprising:
    a plurality of electrical/optical elements;
    an armoring layer surrounding said electrical/optical elements; and
    a plurality of seismic sensor devices arranged at intervals along the cable and connected to said electrical/optical elements;
wherein, in a cross-sectional view of said cable, said armoring layer has a first outer diameter in an area of said cable displaced along said cable from said sensor devices, and a second outer diameter larger than said first outer diameter at the location of said sensors.

2. A seismic cable according to claim 1, wherein said sensor devices are installed in housings integrated in the cable, and wherein the electrical/optical elements are disposed outside of said housings.

3. A seismic cable according to claim 1, wherein said armoring is made from metal wires.

4. A seismic cable according to claim 2, characterized in that the housing is filled with a water repellent filling compound in the spaces between the sensors.

5. A seismic cable according to claim 2, characterized in that the housing is fitted out with bores through which the sensors are interconnected with the electrical/optical elements surrounding the housing.

6. A seismic cable according to claim 2, characterized in that the housing at at least one end is provided with a cone functioning as a bending restrictor.

7. A seismic cable according to claim 2, characterized in that bores in the housing end in cavities for connecting the sensor devices inside the housing with the elongated elements outside.

8. A seismic cable according to claim 2, further comprising a central strength element at least in an area of said cable between successive housings.

9. A seismic cable according to claim 1, wherein said an armoring layer surrounds said electrical/optical elements along substantially the entire length of said cable.

10. A method for making a seismic cable according to claim 1, said method comprising the steps of arranging at least one of said sensor devices at a location in said cable, and providing an armoring along said cable such that said armoring has a larger diameter at the location of said sensor than at other locations of said cable.

11. A method according to claim 10, further comprising the steps of installing at least one housing in said cable, disposing at least one of said sensor elements within said housing, and wherein some of said electrical/optical elements are disposed outside of said housing and inside of said armoring.

12. A method according to claim 10, wherein said armoring is made from metal wires.

13. A method according to claim 11, further comprising the step of filling said housing with a water repellent filling compound in spaces between said sensors.

14. A method according to claim 11, further comprising the step of fitting said housing with bores through which the sensors are interconnected with the electrical/optical elements surrounding the housing.

15. A method according to claim 11, further comprising the step of providing the housing at at least one end with a cone functioning as a bending restrictor.

16. A method according to claim 14, wherein said bores end in cavities for connecting the sensor devices inside the housing with the electrical/optical elements outside.

17. A method according to claim 11, further comprising the step of providing a central strength element at least in an area of said cable between successive housings in said cable.

18. A method according to claim 10, wherein said an armoring layer surrounds said electrical/optical elements along substantially the entire length of said cable.

* * * * *

UNITED STATES PATENT AND TRADEMARK OFFICE
CERTIFICATE OF CORRECTION

PATENT NO. : 6,510,103 B1
DATED : January 21, 2003
INVENTOR(S) : Anton Marius Knudsen and Jorn Wardeberg It is certified that error appears in the above-identified patent and that said Letters Patent is hereby corrected as shown below:

<u>Title page,</u>
Item [73], change the Assignee from "Alcatel" to -- Nexans, Paris (FR) --

Signed and Sealed this

Twenty-ninth Day of July, 2003

JAMES E. ROGAN
*Director of the United States Patent and Trademark Office*